US010419872B2

(12) United States Patent
Low et al.

(10) Patent No.: US 10,419,872 B2
(45) Date of Patent: Sep. 17, 2019

(54) ADAPTABLE MULTIMODE LOCATION PROTOCOL MANAGER

(71) Applicant: Intel Corporation, Santa Clara, CA (US)

(72) Inventors: Su-Lin Low, San Diego, CA (US); Chul-Hyun Oh, San Diego, CA (US); Chun-I Lee, San Diego, CA (US); Hausting Hong, San Diego, CA (US); Michael Cheng-Lai Lee, San Diego, CA (US); Balasubramani Arunachalam, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 365 days.

(21) Appl. No.: 14/620,675

(22) Filed: Feb. 12, 2015

(65) Prior Publication Data
US 2015/0304808 A1 Oct. 22, 2015

Related U.S. Application Data

(60) Provisional application No. 61/981,490, filed on Apr. 18, 2014.

(51) Int. Cl.
*H04W 4/02* (2018.01)
*H04W 88/06* (2009.01)

(52) U.S. Cl.
CPC .............. *H04W 4/02* (2013.01); *H04W 88/06* (2013.01)

(58) Field of Classification Search
CPC .............................. H04W 4/02; H04W 88/06
See application file for complete search history.

(56) References Cited

U.S. PATENT DOCUMENTS

| | | | | |
|---|---|---|---|---|
| 2008/0228654 | A1* | 9/2008 | Edge | H04W 4/02 455/456.2 |
| 2011/0299491 | A1* | 12/2011 | Jang | H04M 3/42042 370/329 |
| 2012/0046014 | A1* | 2/2012 | Wachter | H04W 4/02 455/411 |
| 2012/0069823 | A1* | 3/2012 | Low | H04W 4/00 370/335 |
| 2012/0263101 | A1* | 10/2012 | Jibbe | H04W 76/025 370/328 |
| 2012/0302257 | A1* | 11/2012 | Zhang | G01S 5/0263 455/456.2 |
| 2013/0053034 | A1* | 2/2013 | Lee | H04W 4/02 455/436 |
| 2013/0223335 | A1* | 8/2013 | Kwag | H04W 48/18 370/328 |
| 2013/0317778 | A1* | 11/2013 | Gupta | H04W 4/02 702/150 |
| 2014/0256323 | A1* | 9/2014 | Edge | H04W 64/00 455/436 |

\* cited by examiner

*Primary Examiner* — Lester G Kincaid
*Assistant Examiner* — Daniel G. Bassett
(74) *Attorney, Agent, or Firm* — Schiff Hardin LLP

(57) ABSTRACT

A wireless multimode (MM) device permits different radio access technologies (RAT) to interoperate dynamically with different positioning protocols (PP) by providing a MM Location Protocol Manager (MLM) that is independent of underlying transport mechanisms.

21 Claims, 10 Drawing Sheets

ADAPTABLE MULTIMODE LOCATION PROTOCOL MANAGER

CROSS REFERENCE TO RELATED APPLICATIONS

This application claims the benefit of U.S. provisional patent application Ser. No. 61/981,490, filed 2014 Apr. 18, by Low, et al., and having the title "Adaptable Multimode Location Protocol Manager for a Multimode CDMA/EH-RPD/HRPD/1X, and LTE/UTRA/GGE Wireless Device," which is incorporated herein by reference in its entirety.

BACKGROUND

Field of the Disclosure

The present disclosure relates generally to communications and, more particularly, to wireless communications.

Description of Related Art

The existence of different radio access technologies (RAT) has led to multimode (MM) devices that are capable of employing multiple RATs, such as, for example, CDMA (Code Division Multiple Access), UTRA (UMTS (Universal Mobile Telecommunications System) Terrestrial Radio Access), GGE (GSM (Global System for Mobile Communications)/GPRS (General Packet Radio Service)/EDGE (Enhanced Data for GSM Evolution)), LTE (Long Term Evolution), or various combinations of these RAT, as well as with WiFi (e.g., IEEE 802.11) protocols. As consumer demand for data increases, there are ongoing efforts to add functionality for wireless MM devices.

SUMMARY

The present disclosure teaches a wireless multimode (MM) device that permits different radio access technologies (RAT) to interoperate dynamically with different positioning protocols (PP) through a MM Location Protocol Manager (MLM) that is independent of underlying transport mechanisms. Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Multimode (MM) devices are configured to work with multiple radio access technologies (RAT), such as, for example, CDMA (Code Division Multiple Access (DO/1X/eHRPD (evolved High Rate Packet Data)), UTRA (UMTS (Universal Mobile Telecommunications System) Terrestrial Radio Access), GGE (GSM (Global System for Mobile Communications)/GPRS (General Packet Radio Service)/EDGE (Enhanced Data for GSM Evolution)), LTE (Long Term Evolution), GERAN (GSM EDGE Radio Access Network), or various combinations of these RAT, as well as with WiFi (e.g., IEEE 802.11) protocols. By way of example, as shown in FIG. 1, an application processor (AP) 105 in a MM device (e.g., smartphone, tablet, netbook, laptop computer, etc.) communicates with different RAT modems (e.g., GGE modem 110, UTRA modem 115, LTE modem 120, CDMA modem 125, etc.).

These MM devices can also implement positioning protocol (PP) subsystems, such as, for example, LPP (LTE Positioning Protocol), IS-801 (which is the typical PP for CDMA), RRLP (Radio Resource Location Service Protocol, which is the typical PP for GGE and UTRA. For example, as shown in FIG. 1, the AP 105 is connected to location engines, such as GPS 130 (Global Positioning System), GLONASS 135 (Global Navigation Satellite System, which is a Russian satellite system), BeiDou 140 (which is the Chinese Navigation Satellite System), or other satellite systems (e.g., Galileo, etc.).

Figure 1:
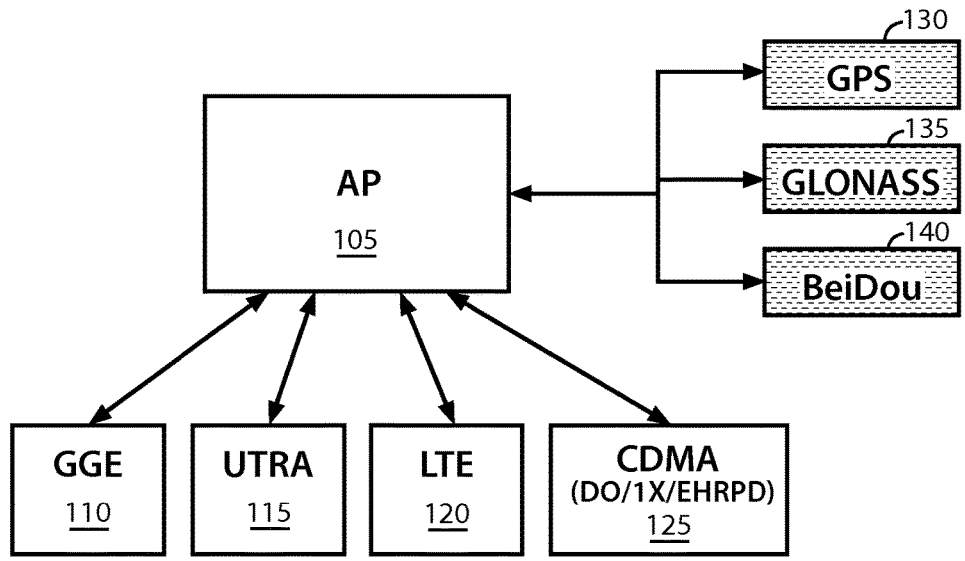
FIG. 1 is a block diagram showing a system for providing location-based services.

Recent MM devices, such as that shown in FIG. 1, have implemented multiple RATs that interoperate with their corresponding PP in order to provide assisted location-based services to consumers. However, each PP is typically customized to its own RAT modem and, therefore, cannot be re-used for another RAT that resides in a different modem stack on the MM device. Consequently, in order to provide assisted location-based services for each of the RATs in the MM device, exhaustive interfaces are typically required for each RAT and its associated PP. As such, the complexity of the interfaces increases with each additional RAT or each additional PP.

Furthermore, for MM location services that use SUPL (Secure User Plane Location), different vendors can implement their own customized SUPL frameworks, which statically associate a specified PP over its corresponding RAT. Consequently, these customized static systems cannot dynamically switch PP when there is a handoff from one RAT to another RAT. Also, to the extent that a particular vendor has implemented a vendor-specific PP, the customized interfaces for one RAT modem stack are not reusable for a different RAT modem stack from a different vendor. In short, there is a problem with interoperability between different RAT modem vendors.

In view of these and other problems with conventional MM devices, the disclosed embodiments provide adaptable MM location protocol managers that simplify the RAT-PP interface by providing interoperability between different RAT and different PP. For some embodiments, an adaptable MM device comprises a MM Location Protocol Manager (MLM) that interfaces with a MM Controller (MMC). The combination of the MLM and the MMC provides a universal and adaptable architecture that allows for interoperability between different RAT and PP from different vendors.

Having broadly described an adaptable MM device, reference is now made in detail to the description of the embodiments as illustrated in FIGS. 2 through 9. While several embodiments are described in connection with these drawings, there is no intent to limit the disclosure to the embodiment or embodiments disclosed herein. On the contrary, the intent is to cover all alternatives, modifications, and equivalents.

Figure 2:
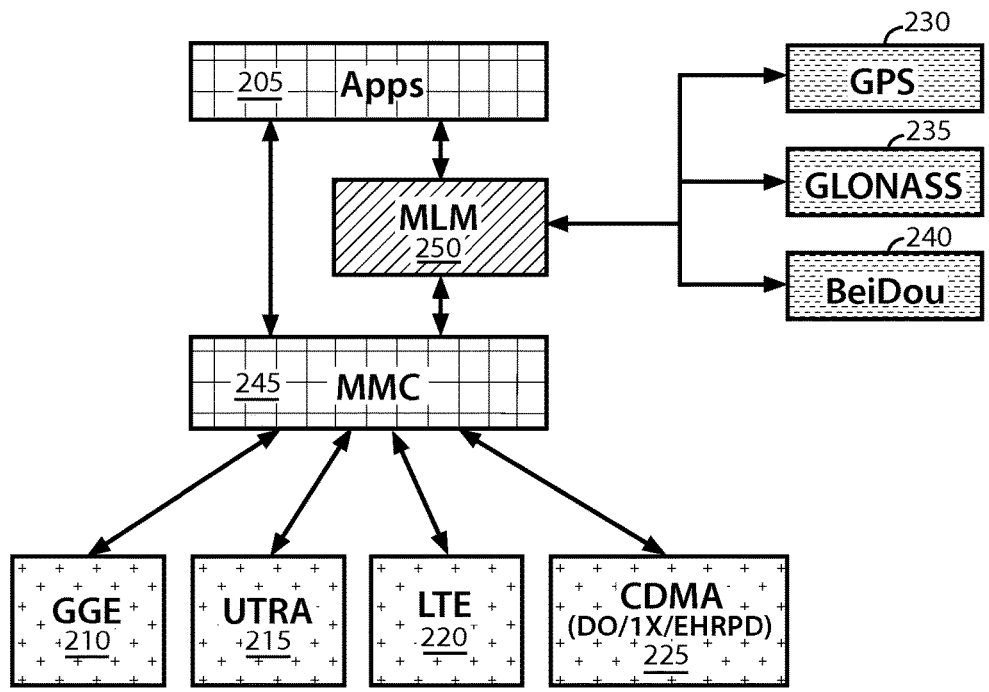
FIG. 2 is a block diagram showing one embodiment of a general architecture for providing location-based services using a transport-independent mechanism.

FIG. 2 is a block diagram showing one embodiment of a general architecture for providing location-based services using a transport-independent mechanism. Similar to the architecture of FIG. 1, the architecture of FIG. 2 comprises multiple RAT modems, such as a GGE modem 210, an UTRA modem 215, a LTE modem 220, a CDMA modem 225, etc. Insofar as GGE, UTRA, LTE, and CDMA modems are familiar to those having skill in the art, and insofar as the standards governing data transmission over these types of modems is known in the art, further discussion of these particular modems is omitted in this disclosure. FIG. 2 (like FIG. 1) also comprises multiple location engines, such as GPS 230, GLONASS 235, BeiDou 240, or other satellite systems (e.g., Galileo, etc.). Again, since these location engines are familiar to those having skill in the art, further discussions of GPS, GLONASS, and BeiDou are omitted here.

One primary difference between FIG. 1 and FIG. 2 is the way in which the RAT modems 210, 215, 220, 225 interface with the location engines 230, 235, 240. For example, FIG. 2 comprises an MM controller (MMC) 245 combined with a MM Location Protocol Manager (MLM) 250, which provide the interface between the location engines 230, 235, 240 and the RAT modems 210, 215, 220, 225. In this embodiment, the MMC 245 provides a secure packet data transport over the different RATs, while the MLM 250 generates transport-independent packets that are used to communicate with the location engines independently of which RAT provides the secure packet data transport. Thus, when a location service application 205 triggers a location-based service, the MLM 250 provides transport-independent data packets that interoperate with many different RATs and many different positioning protocols (PPs). Several embodiments, showing the MLM 250 in greater detail, are described below with reference to FIGS. 3 through 9.

Figure 3:
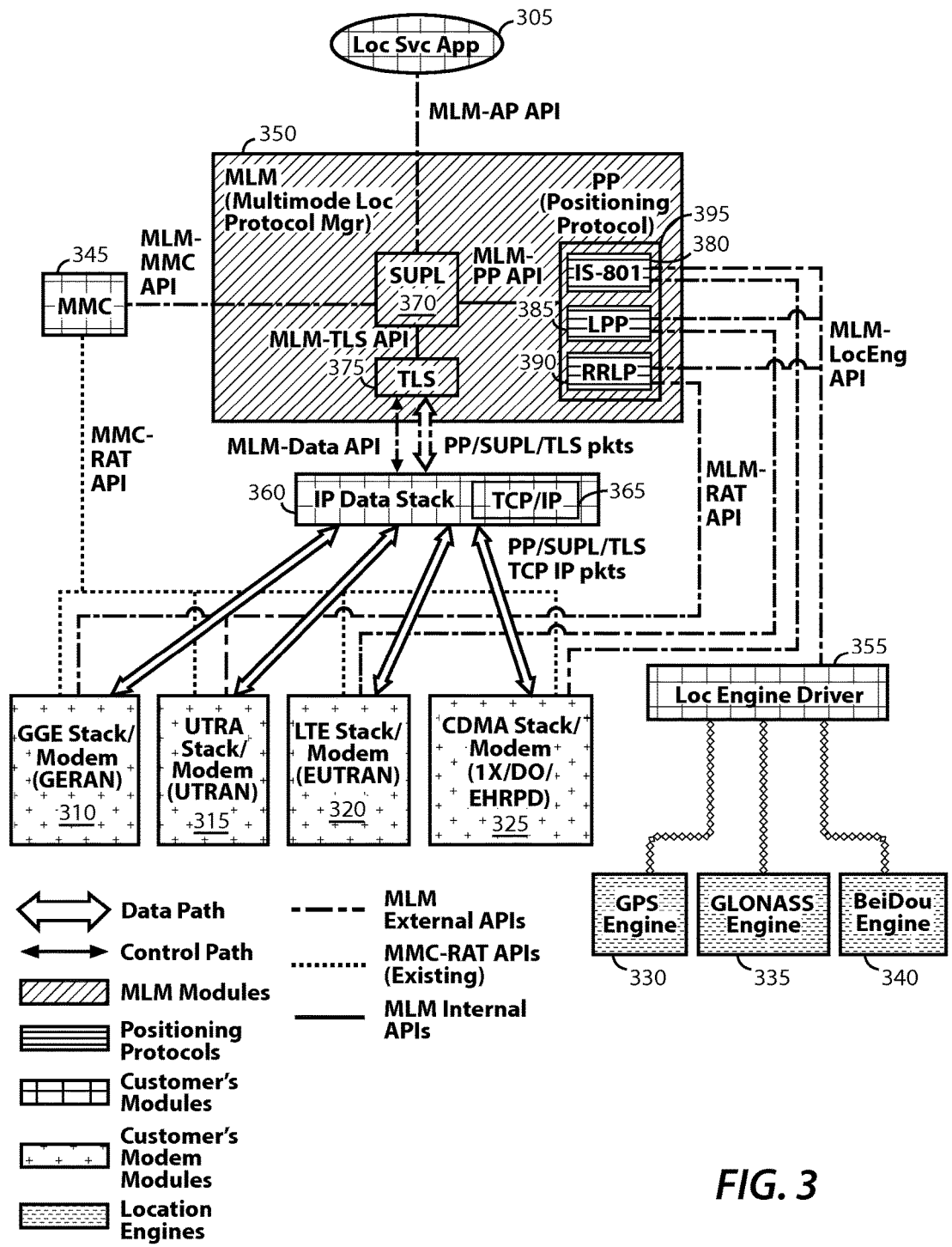
FIG. 3 is a block diagram showing one embodiment of an environment comprising a multimode (MM) Location Protocol Manager (MLM) for providing location-based services using a transport-independent mechanism.

For example, FIG. 3 is a block diagram showing one embodiment of an environment comprising a MLM 350 that permits transport-independent location-based services. Starting with conventional components, the environment of FIG. 3 comprises a location service application 305, several different RAT modems (e.g., GGE modem 310, UTRA modem 315, LTE modem 320, CDMA modem 325, etc.), and a location engine driver 355 that drives several location engines (e.g., GPS engine 330, GLONASS engine 335, BeiDou engine 340, etc.). The modems 310, 315, 320, 325 are communicatively coupled to an Internet Protocol (IP) data stack 360 (with a Transmission Control Protocol (TCP)/IP stack 365). Since location service applications, conventional modems, conventional location engines, location engine drivers, and TCP/IP stacks are well known in the art, further discussions of these particular components are omitted herein.

In addition to the conventional components, FIG. 3 comprises a MMC 345 and a MLM 350, which provide transport-independent packets that allow for dynamic interoperability between the different RAT modems 310, 315, 320, 325 and various PPs to provide accurate location-based services. In order to maximize location accuracy, a particular PP is implemented for a particular RAT, and that PP performs message exchange with network positioning servers that provide reference position calculations and satellite status information to a MM device (also designated as user equipment (UE)). Various communications standards (e.g., 3gpp, 3gpp2, etc.) specify a de facto PP for each wireless technology. By way of example, IS-801 is the PP for CDMA, RRLP is the PP for UTRA and GGE, LPP is the PP for LTE, etc. These PP enable RAT-specific information, radio measurements, ephemeris, almanac, acquisition assistance data, etc. to be communicated between a particular location engine 330, 335, 340, a particular RAT modem 310, 315, 320, 325, and the network position server (not shown), thereby allowing for detailed position or location results to be calculated by the UE or the network position server.

In order to provide a common secure IP data session for the PP for all different transport networks, a Secure User Plane Location (SUPL) protocol has been defined by the Open Mobile Alliance (OMA). The SUPL protocol permits a secure Transport Layer Security (TLS) TCP/IP session for any of the PP payloads during a PP message exchange for a location-based service. The SUPL protocol also permits the PP payload to be transported over any underlying RAT. Thus, in the embodiment of FIG. 3, the MLM 350 comprises a SUPL module 370, a TLS module 375, and a PP subsystem 395, with the PP subsystem 395 comprising various PP (e.g., IS-801 (380), LPP (385), RRLP (390), etc.). The SUPL module 370, the TLS module 375, and the PP subsystem provide the transport-independent packets that are common to all of the PPs and transportable over each of the different RATs.

The SUPL module 370 is the primary controller of the MLM 350. As such, the SUPL module 370 processes a location query that it receives from the location service application 305. The communications between the location service application 305 and the SUPL module 370 are facilitated by MLM-AP application program interfaces (APIs), such as those shown in TABLE 1. For example, the MLM-AP APIs specify the interfaces with the location service application 305, which is the source of the SUPL location session trigger. The location service application 305 can reside on an external AP for typical smartphone devices. After location data is obtained by the MLM 350 and processed, the MLM 350 reports the location result back to the location service application 305.

TABLE 1

| MLM-AP APIs | |
|---|---|
| MLMAP_LocReq | The Location Service Application sends this request to MLM to trigger an assisted location position query, with a specified Positioning Method (SET (SUPL-Enabled Terminal)-Assisted, or SET-Based), the positioning rate (number of fixes, and time interval between fixes), Quality of Position, and network SLP (SUPL Location Platform) address information. |
| MLMAP_LocRsp | The MLM reports the calculated position fix results from assistance from the network position servers. This results can be sent periodically according to the positioning rate. |
| MLMAP_Loc_Abort | The Location Service Application uses this API to abort a location service query request. |

Upon receiving the location query from the location service application 305, the SUPL module 370 triggers a query to the MMC 345 to determine a current RAT status from the RAT modems 310, 315, 320, 325 that are communicatively coupled to the MMC 345. The communications between the SUPL module 370 and the MMC 345 are facilitated by MLM-MMC APIs, such as those shown in TABLE 2. For example, the MLM-MMC APIs allow the MLM 350 to establish a data connection with the requested RAT that is currently active and identified as the underlying transport for the location-based service. The MMC 345 uses the MMC-RAT APIs to set up the data connection with the desired RAT modem 310, 315, 320, or 325.

TABLE 2

| MLM-MMC APIs | |
|---|---|
| MMCMLM_PktConnReq | MLM sends this message to MMC to request for a packet call setup connection on the current best available RAT system. If a packet data connection is already established on the current RAT, this RAT information will be returned to MLM. |
| MLMMMC_PktConnRsp | MMC returns the current active RAT information for an active packet call connection setup. |
| MMCMLM_PktRelReq | MLM sends this message to MMC to request the release of a packet data connection when it no longer needs it for assisted location service. MMC may or may not release its current active packet connection depending on whether there are other packet data users. |
| MLMMMC_PktRelRsp | MMC returns the status of the packet connection release request. |
| MMCMLM_PktNetwork_Status_Req | MLM sends this message to the MMC to query the current active RAT status. |
| MLMMMC_PktNetwork_Status_Rsp | MMC provides the current active RAT status. |
| MLMMMC_PktNetwork_Status_Ind | The MMC sends this unsolicited indication if a to MLM handoff from a RAT to another multimode RAT occurs successfully. |

The communications between the MMC 345 and the RAT modems 310, 315, 320, 325 are facilitated by MMC-RAT APIs, such as those shown in TABLE 3. The MLM-RAT APIs specify the interface between the MLM PP and the customer RAT so that UE-specific information for the location-based service can be exchanged. By way of example, the MLM-RAT APIs handle information requests between: (a) the IS-801 module 380 and the CDMA modem 325; (b) the LPP module 385 and the LTE modem 320, the GGE modem 310, and/or the UTRA modem 315; and (c) the RRLP module 390 and the UTRA modem 315 and/or the GGE modem 310.

TABLE 3

| MLM-RAT APIs | |
|---|---|
| RATMLM_InfoReq | MLM's Positioning Protocol sends this to a RAT to request for RAT specific information that is needed for communicating with the network position servers to provide assisted location service operation. These |

TABLE 3-continued

| MLM-RAT APIs | |
|---|---|
| | information is dependent on the Positioning Method chosen, the selected PP, and the selected RAT. The request comprises a union of data structures for each selected PP and RAT. Example of information requested include UE capabilities, MSInfo, SysParamInfo, Pilot Phase Measurements. |
| MLMRAT_InfoRsp | The RAT responds with the required information that was requested. |

Upon determining the current RAT status, the SUPL 370 determines the appropriate PP to use for the location-based service. Upon determining the PP, the SUPL 370 initiates a SUPL state machine to open a SUPL session with a network SUPL Location Platform (SLP, not shown in FIG. 3). The SUPL module 370 interfaces with the PP subsystem 395 using MLM-PP APIs to permit PP message exchange with the network. The location engine driver 355 is a driver layer that processes data and communicates information to the various location engines (e.g., GPS engine 330, GLONASS engine 335, BeiDou engine 340, etc.). Thus, as shown in FIG. 3, the communications between the PP subsystems 395 and the location engine driver 355 are facilitated by MLM-LocEng APIs, such as those shown in TABLE 4. For example, the MLM-LocEng APIs transfer location information, ephemeris, almanac, acquisition assistance data, etc. between the PP subsystem 395 and the location engine driver 355.

TABLE 4

| MLM-LocEng APIs | |
|---|---|
| LocEngMLM_LocReq | MLM's PP sends this request to the Location Engine (LocEng) driver to startup and provide assistance data to the Location Engine for faster acquisition. Such data include Acquisition Assistence (AA), and Sensitivity Assistence (SA) information, as well as satellite Ephemeris, Almanac, and network server reference location data. At the same time, MLM requests the Location Engine to provide Pseudo-Range Measurements (PRM) from its location measurements, or calculated position fixes (in the SET-Based case). This is then communicated with the network Position Server. |
| MLMLocEng_LocRsp | LocEng responds with the requested PRM or calculated position results as requested by MLM. |

The SUPL module 370 also implements SUPL User Location Protocol (ULP) in the SUPL protocol as defined by the OMA. The SUPL ULP includes call flows with the SLP, ULP message encoding/decoding, and PP negotiation (which determines the PP or positioning method to use). Consequently, the SUPL module 370 provides a generic, secure message-exchange framework that is common to all of the PPs and all of the RATs in the MM system.

Continuing the description of the MLM 350, the TLS module 375 provides a secure IP transport layer for the SUPL packets. When the SUPL module 370 is ready to start a SUPL session, the SUPL module 370 invokes a secure TLS session with the TLS module 375 using MLM-TLS APIs.

The TLS module 375 then opens a TCP/IP connection with the underlying RAT modem (310, 315, 320, or 325) for transporting secure PP/SUPL/TLS packets. Communications between the TLS module 375 and the underlying RAT modem (310, 315, 320, or 325) are facilitated by MLM-Data APIs, such as those shown in TABLE 5. For example, the MLM-Data APIs allow the MLM 350 to set up a TCP/IP connection with the IP data stack 360 over an underlying RAT. Once the TCP/IP connection is established, user location packet data, which include PP/SUPL/TLS packets, can be transported to the TCP/IP layer. The MLM-Data APIs also include the user plane data path between the MLM 350 and the data IP data stack 360.

TABLE 5

| MLM-Data APIs | |
|---|---|
| DataMLM_TCPConnOpenReq | MLM's SUPL/TLS sends this to the data stack to request for a TCP/IP connection to the network SUPL Location Platform (SLP) address. In a |

TABLE 5-continued

| MLM-Data APIs | |
|---|---|
| | typical implantation, this would translate to a call to an IP Data Stack's existing TCP/IP connection usage interface API. These may be well established APIs from an AP's Andriod or Windows OS data stack interfaces that can be reused easily. |
| MLMData_TCPConnOpenRsp | Data stack responds with the status after the TCP/IP connection is opened. |
| DataMLM_TCPConnRelReq | MLM's SUPL/TLS sends this to the data stack to request for a TCP/IP connection release. |
| MLMData_TCPConnRelRsp | Data stack responds with the status after the TCP/IP connection is released. |
| DataMLM_DataFrame (user plane) | This is the user plane packet frame (comprising encoded PP/SUPL/TLS payload) that is sent from the MLM to the TCP/IP stack. |
| MLMData_DataFrame (user plane) | This is the user plane packet frame (comprising PP/SUPL/TLS payload) that is sent from the TCP/IP stack to the MLM's TLS and SUPL for further decoding. |

Continuing the description of the MLM 350, the PP subsystem 395 comprises various PP modules, such as an IS-801 module 380, a LPP module 385, and a RRLP module 390. The PP is transported over a SUPL frame over TLS/TCP/IP using a RAT to a peer PP on the network side, thereby providing for location-based services. As is known, the LPP module 385 uses a PP that can be used in LTE networks, UTRA networks. GGE networks, or even CDMA networks. For some embodiments, the LPP module 385 implements the LTE Positioning Protocol as defined in 3gpp TS36.355, and also the LTE Extensions Requirements v2.0, issued by the OMA. The IS-801 module 380 can be used in CDMA networks and implements IS-801, IS-801-1, IS-801-B standards. The RRLP module 390 can be used in GGE networks or UTRA networks and implements the 3gpp TS44.031 (Radio Resource LCS (Location Service) Protocol (RRLP)). Insofar as these PPs are familiar to those having skill in the art, further discussions of these PPs are omitted here.

Figure 4:
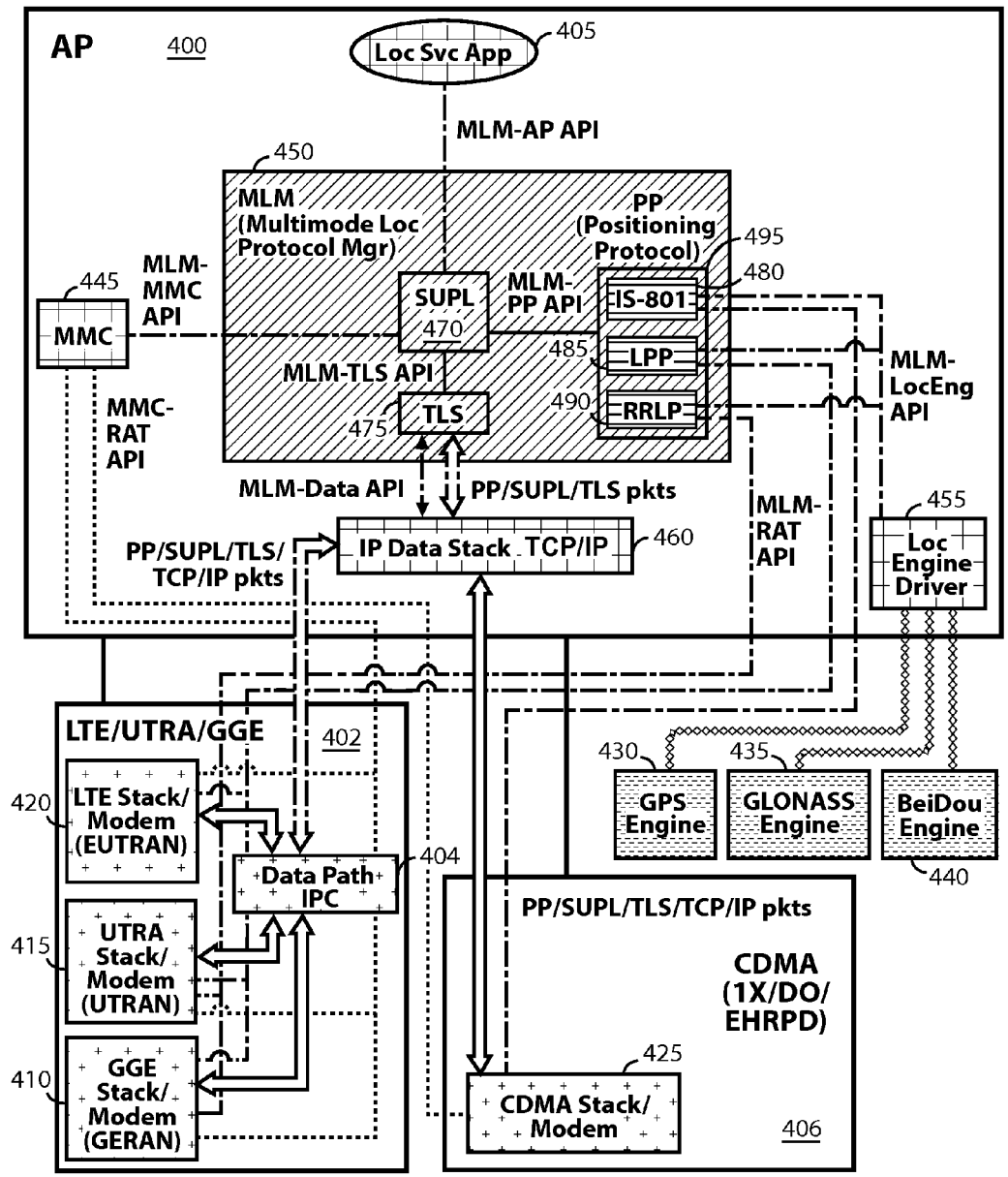
FIG. 4 is a block diagram showing one embodiment of a device comprising a MLM for providing transport-independent location-based services.

FIG. 4 shows a block diagram of one embodiment of a device where the MLM 450 is integrated into an application processor (AP) 400. As shown from the environment of FIG. 4, using a MLM 450 permits faster time-to-market solutions for MM devices (e.g., smartphones, etc.). This is because the MLM 450 can be readily integrated into the AP software on a particular vendor's AP platform due to the MLM 450 interfacing with the AP's location service application 405, the MMC 445, the location engine driver 455, and the IP data stack 460 via generic APIs. The MLM 450 also communicates with the RAT modems 410, 415, 420, 425 across the different modem chips using existing underlying inter-process communication (IPC) transport mechanisms, such as Remote Procedure Call (RPC), dual-port Random Access Memory (DPRAM), Universal Serial Bus (USB), Universal Asynchronous Receiver/Transmitter (UART), Secure Digital Input/Output (SDIO), etc.

The IP data stack 460 also transports the PP/SUPL/TLS/TCP/IP frames to the RATs 410, 415, 420, 425 using existing data path transport links. Upon a location query trigger from the location service application 405, the MLM 450 queries the MMC 445 for the current MM modem status to deploy the PP for location results. By way of example, if the current active RAT is CDMA, then IS-801 will be used; if the current active RAT is LTE, then LPP will be used (unless network only support RRLP); if the current active RAT is GGE or UTRA, then RRLP will be used (unless network can support LPP), etc.

The MLM 450 also determines the PP and positioning method (SUPL Enabled Terminal (SET)-Assisted, or SET-Based) to use, and, should there be no existing data connections available, the MLM 450 also requests the MMC 445 to set up a packet data connection with the current active RAT modem 410, 415, 420, or 425. The SUPL module 470 interfaces with the IP data stack 460 to establish a TCP/IP data connection for the transport of user plane PP/SUPL/TLS packets. Following this, the SUPL module 470 establishes a TLS session with the TLS module 475 to exchange SUPL packets. These SUPL packets are transported over the currently-active RAT as determined by the MMC 445. The SUPL module 470 then triggers a SUPL session with the network's SLP to negotiate and determine the suitable PP (IS-801, LPP, RRLP, etc.) and positioning method (SET-Assisted, SET-Based, or autonomous stand-alone). The SUPL module 470 then performs the PP message exchange using SUPL_POS messages with the network's SLP. Once the final position result is obtained and calculated, this result is sent back to the location service application 405.

Figure 5:
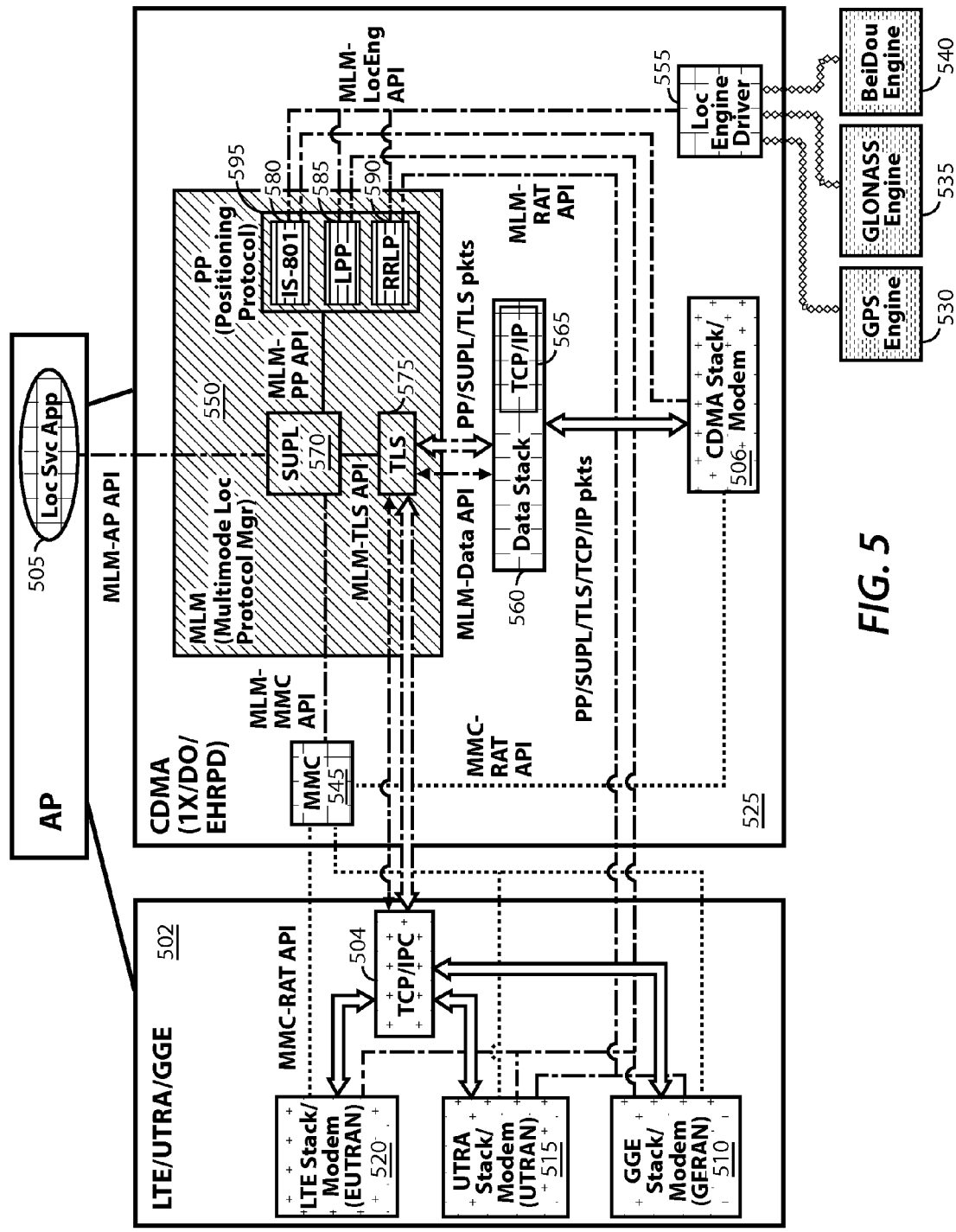
FIG. 5 is a block diagram showing another embodiment of a device comprising a MLM for providing transport-independent location-based services.

FIG. 5 is a block diagram showing another embodiment in which the MLM 550 is located on a CDMA modem 525. Since the MLM 550 is portable and independent of both the platform and the operating system (OS), the MLM 550 can reside on one of the modem chip platforms, as shown in FIG. 5. Co-locating the MLM 550 with the location engine driver 555 permits faster performance due to the closer proximity of these components. Insofar as the other components of FIG. 5 have been discussed with reference to FIGS. 3 and 4, further discussions of those components are omitted here.

Figure 6:
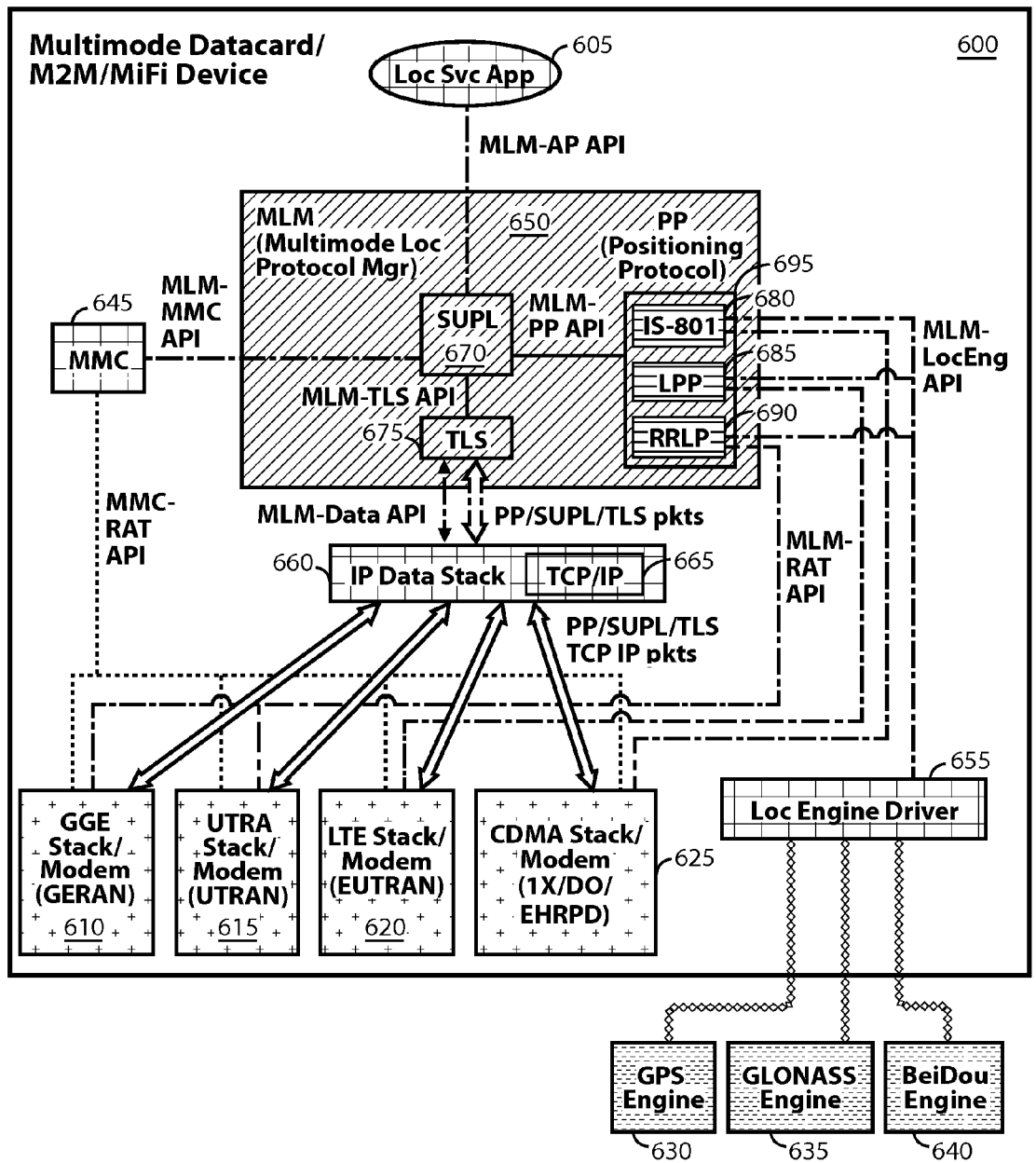
FIG. 6 is a block diagram showing yet another embodiment of a device comprising a MLM for providing transport-independent location-based services.

FIG. 6 is a block diagram showing yet another embodiment in which the MLM 650 is located on a data card. Due to the versatility of the MLM 650, different device configurations can support the MLM 650. By way of example, the different configurations can be single-chip or multi-chip configurations. Additionally, the different devices that can support the MLM 650 include smartphones, tablets, netbooks, data card modules (similar to the one shown in FIG. 6), machine-to-machine (M2M) devices, MiFi devices, etc. As shown in FIG. 6, the MLM 650 is co-located with the location service application 605, the MMC 645, the location engine driver 655, the IP data stack 660, and the modem stacks (e.g., GGE 610, UTRA 615, LTE 620, CDMA 625, etc.).

Figure 7:
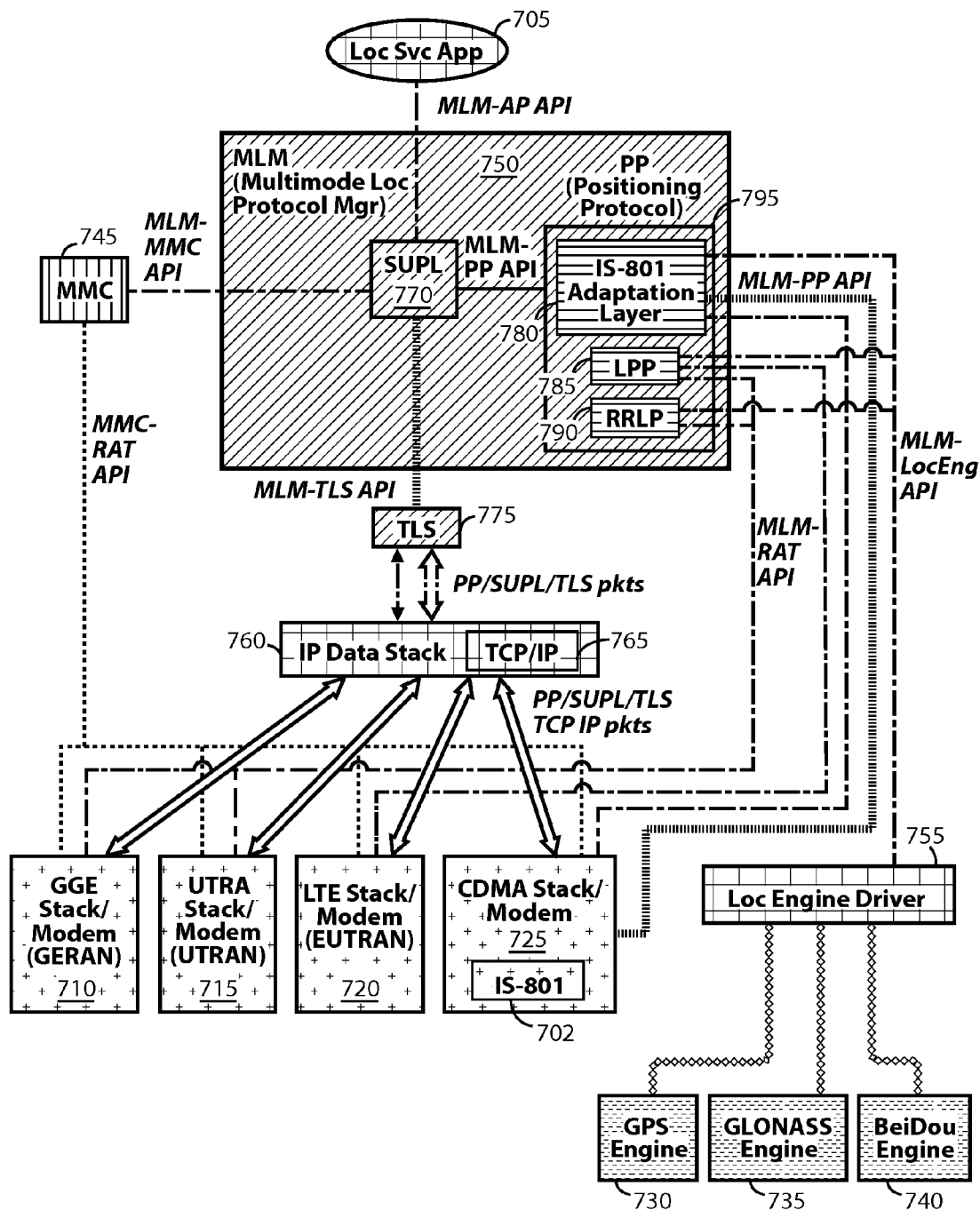
FIG. 7 is a block diagram showing one embodiment of an environment comprising one embodiment of a MLM with a customized positioning protocol (PP).

FIG. 7 is a block diagram showing one embodiment of an environment comprising one embodiment of a MLM 750 with a customized positioning protocol (PP). Due to the versatility of the MLM 750, different customer solutions can be accommodated. In the embodiment of FIG. 7, a customer provides its own IS-801 PP 702 and TLS stack 775. The generic MLM-PP API communicates with the IS-801 adaptation layer 780 and specifies the interface between the SUPL module 770 and the PP subsystem 795. It should be noted that the generic MLM-PP API is used for communicating with all of the modules in the PP subsystem 795, irrespective of whether they reside internally or externally to the MLM 750. The IS-801 adaptation layer can in turn translate this API to interface with the customer's IS-801 PP 702. In the embodiment of FIG. 7, where the customer uses its own TLS layer 775, the generic MLM-TLS API permits the SUPL module 770 to open and close secure TLS connections with the customer's TLS module 775.

As shown in the embodiments of FIGS. 3 through 7, the MLM is independent of underlying transport methods and, therefore, is capable of doing what conventional devices cannot. For example, any IPC method over any physical layer transport mechanism such as ESPI, SDIO, USB, UART, DPRAM, with separate channels for each MLM API, can be used. Additionally, the MLM is: (a) easily upgradable and extensible to different carrier and different vendor requirements; (b) readily adaptable to future standards enhancements or changes; and (c) configurable for additions of new PP or for extensions to existing PP. Also, the MLM framework and the APIs are readily modifiable to allow nearly unrestricted configurability. Moreover, the MLM is a universal and generic solution for all wireless technologies, including cellular wireless technologies (CDMA, UTRA, GGE, LTE), and any WiFi technologies as well. Furthermore, the PP can interwork with any RAT during MM operations and not restricted to a specific wireless technology, thereby permitting dynamic interoperability, such as when a handoff from LTE to CDMA occurs. Finally, LPP or RRLP positioning protocols can be transported over the CDMA network if needed, and RRLP and LPP can also support transport over LTE, UTRA, or GGE, depending on the network support.

Figure 8A:
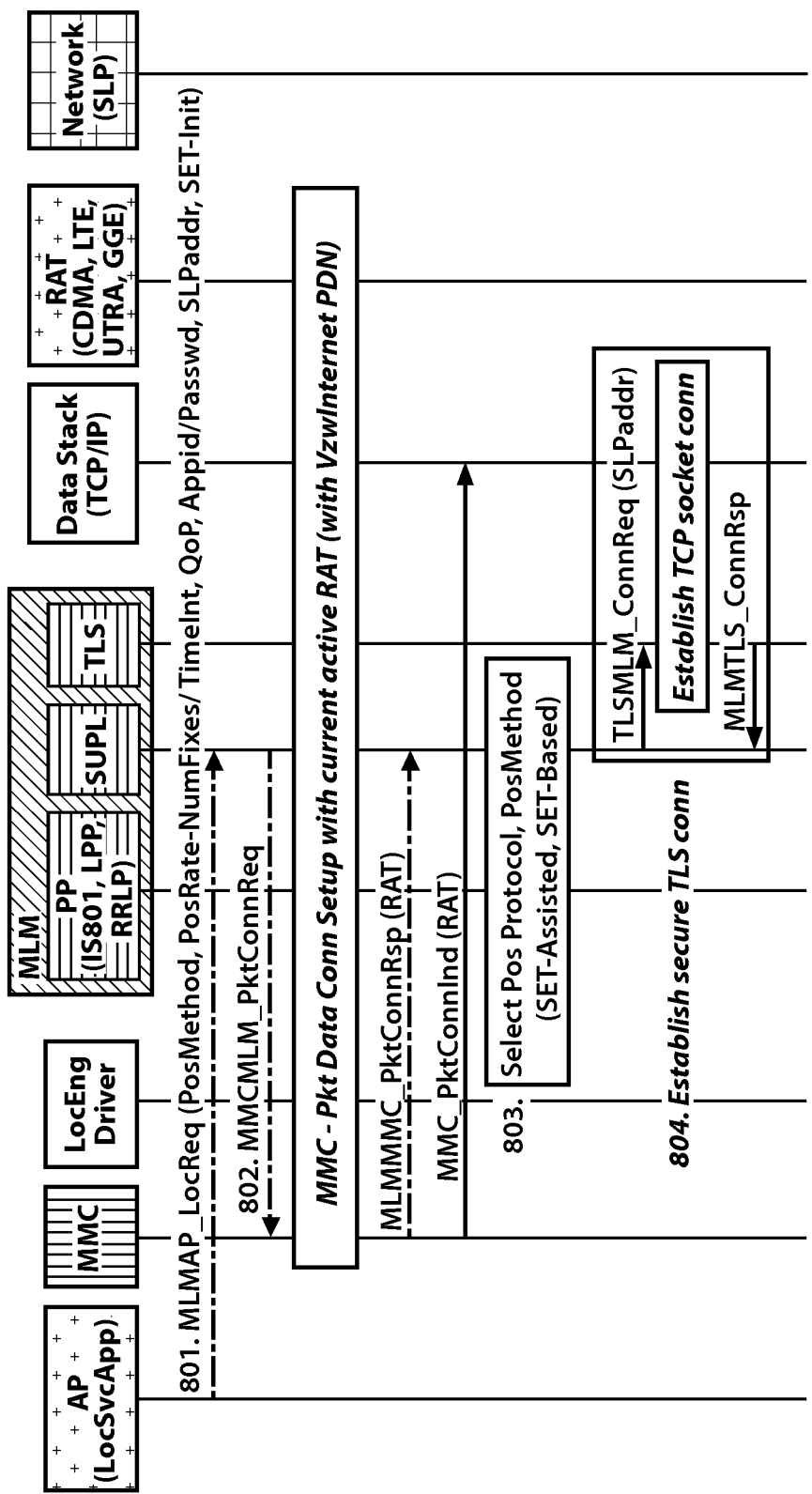
FIGS. 8A and 8B are diagrams showing one embodiment of a process for providing transport-independent location-based services.
Figure 8B:
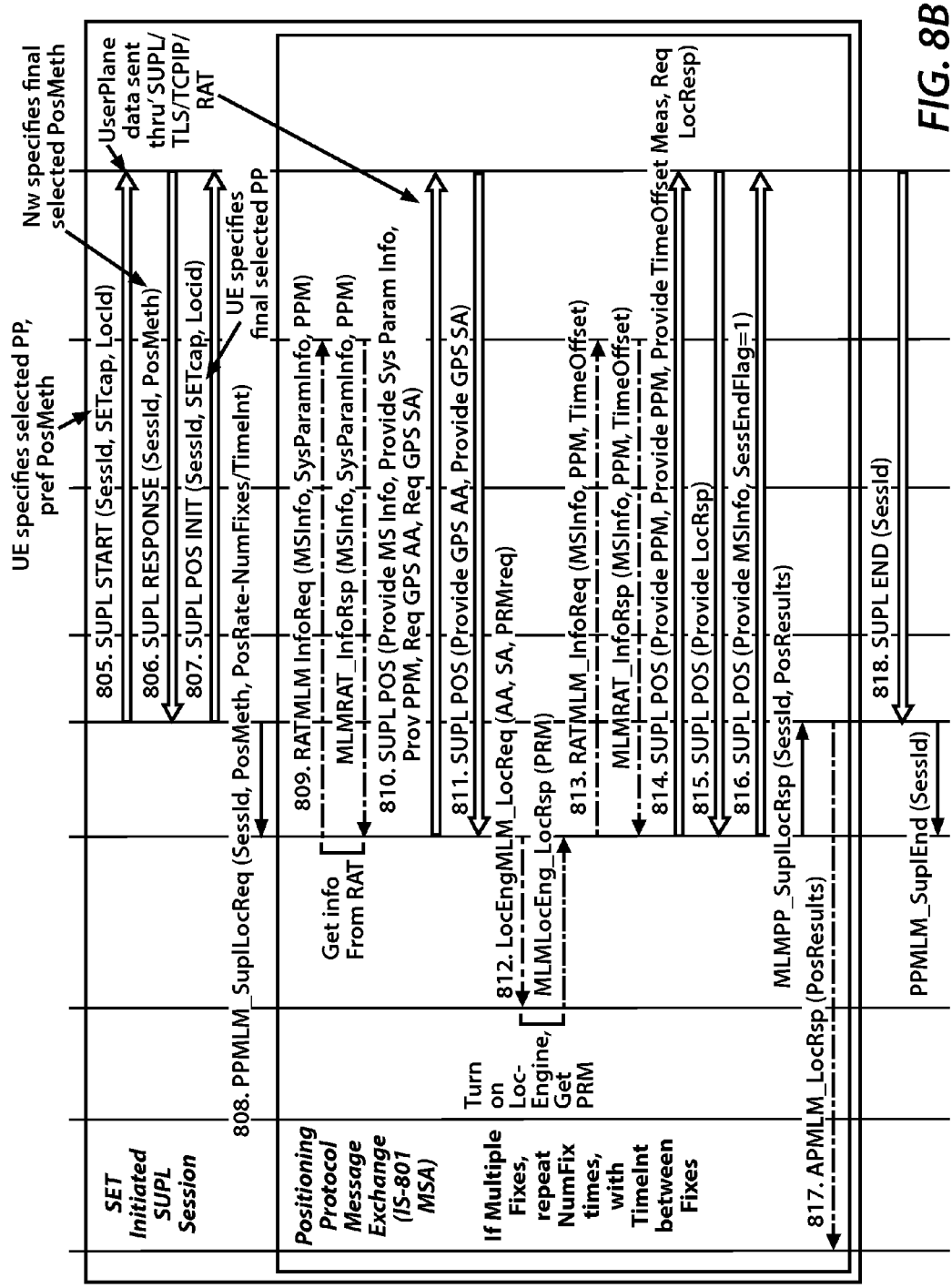

With all of these advantages in mind, attention is turned to FIGS. 8A, 8B, 9A and 9B, which provide several embodiments of processes associated with transport-independent location-based services. Specifically, FIGS. 8A and 8B show one embodiment of the MLM APIs for a MM vendor interworking with an AP vendor to provide assisted location service using IS-801 and SUPL. In particular, the location service is triggered from a user SUPL Enabled Terminal (SET), and the assisted location service method is SET-Assisted, where the final position is calculated at the network.

Starting in FIG. 8A, in step 801, the location service application triggers a location position query to the MLM, specifying the position method (SET-Assisted, SET-Based), the positioning rate (number of fixes and time interval between fixes), as well as quality of position. The network SLP address is also provided. In step 802, the MLM sends a packet connection request to the MMC to request a packet call setup to the current best available RAT. If a packet connection is already available, the MMC immediately responds with this information to MLM. Otherwise, a packet call is set up for the current RAT. If a handoff to a different RAT occurs, then an indication is also sent to MLM.

In step 803, the MLM selects the best PP (given the available RAT). It should be noted that a de facto PP is typically chosen for each RAT. However, the network may not support a specific PP for a given RAT. For example, LPP is typically used with LTE, but if the network only supports RRLP, then RRLP is chosen for LTE. In step 804, the MLM establishes a secure TLS connection with the network SLP. The MLM interfaces with the platform's TCP/IP stack to establish a TCP/IP socket connection with the SLP.

Continuing in FIG. 8B, in step 805, the SUPL module in MLM begins a SUPL session by sending a SUPL_START message to the peer network SLP, proposing the selected PP and preferred Positioning Method. The SUPL message is encoded and sent as a payload to the TLS/TCP/IP stack as an IP packet in the user plane and sent out through the RAT physical transport layer. In step 806, the SLP responds with a final selected Positioning Method in a SUPL_RESPONSE message. In step 807, the MLM send a SUPL_POS_INIT message to SLP with the final selected PP. In step 808, the SUPL module triggers its PP module to begin the assisted location service PP (IS-801) message exchange. In step 809, the PP module requests RAT specific information from the selected RAT, such as MSInfo, SysParamInfo, PPM. The RAT gathers this information and responds to the PP.

In step 810, the PP module sends the information as an IS-801 payload encapsulated in a SUPL_POS message, to the network PP server, through the underlying secure SUPL/TLS/TCP/IP connection via the RAT transport layer. The PP also requests location engine AA and SA information to aid in the location acquisition process. In step 811, the network PP server provides the AA and SA information through the SUPL_POS payload. In step 812, the PP module triggers the location engine to turn on and provide the AA and SA data, and request for Pseudo-Range Measurements (PRM) at the same time. In step 813, the PP module requests other IS-801 information such as Pilot Phase Measurement (PPM) and TimeOffset from the RAT.

In step 814, the PP module sends PRM, PPM, TimeOffset information to the network server for final position calculation, and requests for this position result. In step 815, the network server calculates the final position and sends it to the UE in the SUPL_POS IS-801 payload. In step 816, the PP IS-801 message exchange through SUPL_POS is repeated for the required number of fixes. If no more fixes are needed, then the PP module indicates the end of the session to the network. In step 817, each calculated final position result is sent back to the Location Service Application. In step 818, the SLP sends a SUPL_END to end the SUPL session if no more position fixes are needed.

Figure 9A:
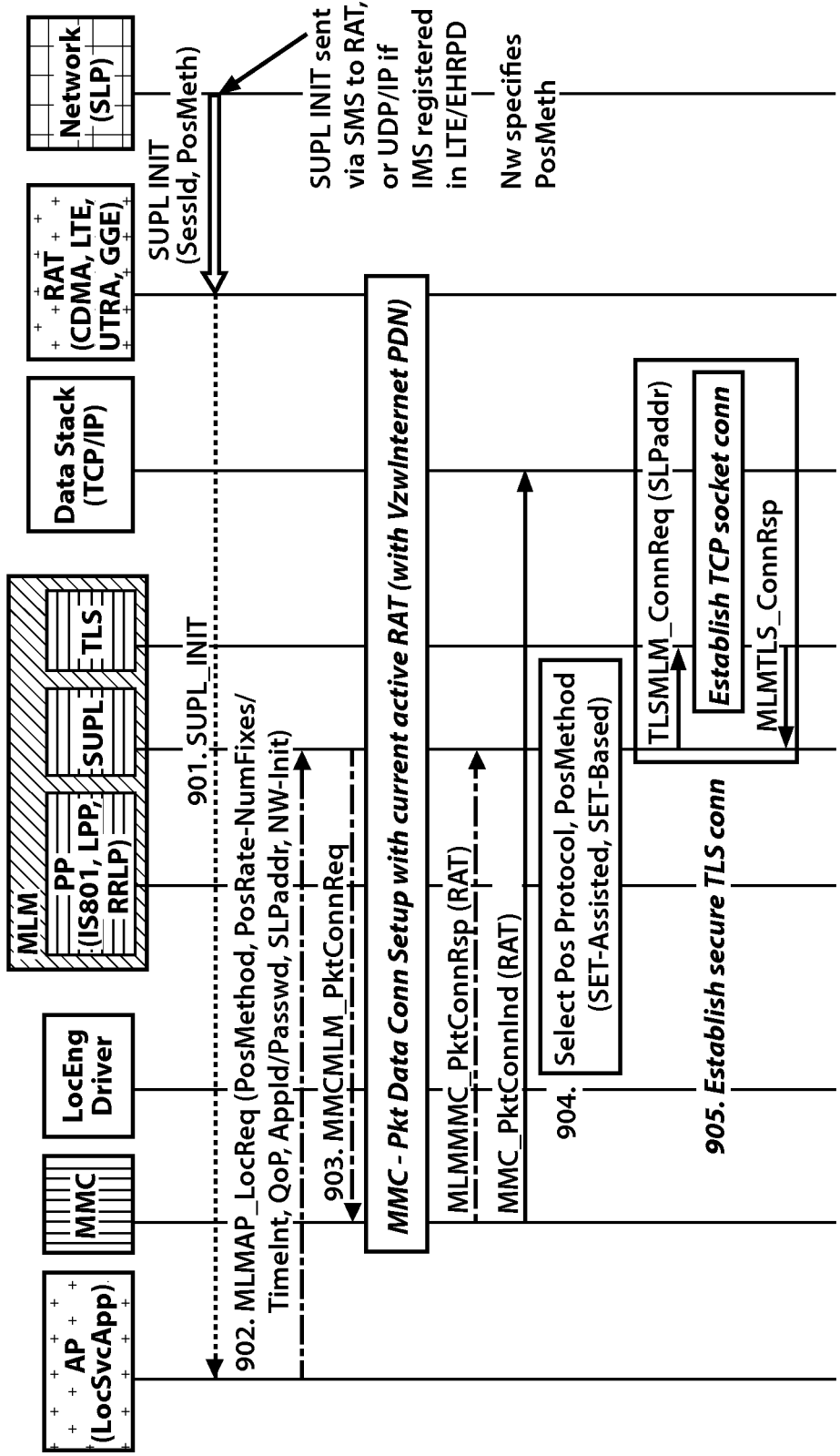
FIGS. 9A and 9B are diagrams showing another embodiment of a process for providing transport-independent location-based services.
Figure 9B:
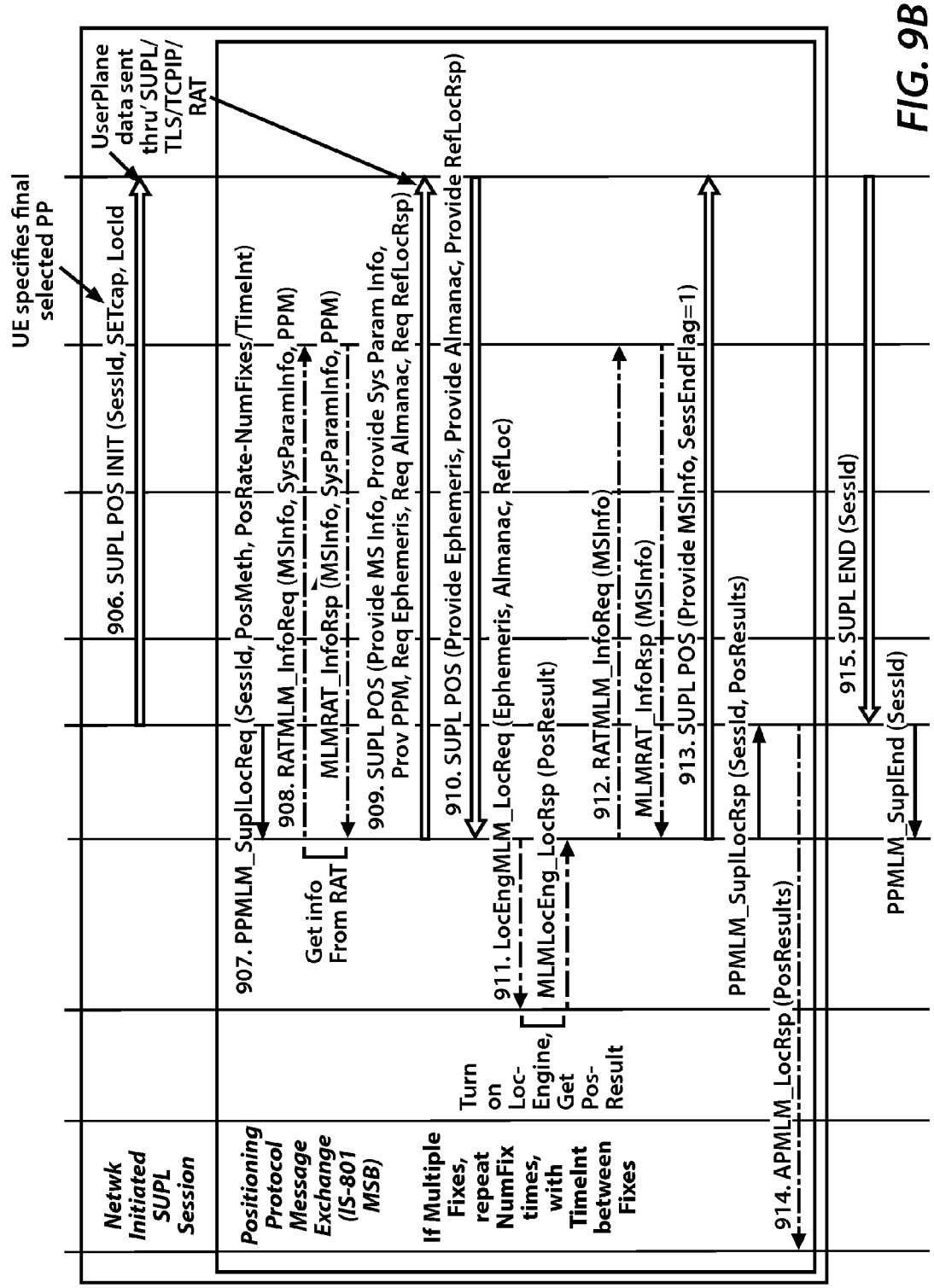

FIGS. 9A and 9B show one embodiment that uses MLM APIs for an MM vendor interworking with an AP vendor to provide assisted location service using IS-801 and SUPL. For FIGS. 9A and 9B, the location service is triggered from the network, the assisted location service method is SET-Based, and the final position is calculated at the user terminal.

Starting in FIG. 9A, in step 901, the network SLP server initiates a SUPL location session by sending a SUPL_INIT message to the UE. This can be either sent via SMS to the RAT or through a UDP IP packet if IMS service is registered for the RAT. The SUPL_INIT message is passed to the location service application. The network determines the final selected Positioning Method. In step 902, the Location Service Application triggers the network-initiated location position query to the MLM, specifying the position method (SET-Assisted, SET-Based), the positioning rate (number of fixes and time interval between fixes), as well as quality of position. The network SLP address is also provided.

In step 903, the MLM sends a packet connection request to the MMC to request a packet call setup to the current best available RAT. If a packet connection is already available, then the MMC immediately responds with this information to MLM. Otherwise, a packet call is setup for the current RAT. If a handoff to a different RAT occurs, then an indication of the handoff is also sent to MLM. In step 904, the MLM selects the best PP given the available RAT. In step 905, the MLM establishes a secure TLS connection with the network SLP. The MLM also interfaces with the platform's TCP/IP stack to establish a TCP/IP socket connection with the SLP.

Continuing in FIG. 9B, in step 906, the SUPL module in MLM sends a SUPL_POS_INIT message to the SLP, indicating the final selected PP. This SUPL message is sent as a payload to the TLS/TCP/IP packet and sent via the RAT physical layer transport to the peer SUPL at the network SLP. In step 907, the SUPL module triggers its PP module to begin the assisted location service PP (IS-801) message exchange. In step 908, the PP module requests RAT specific information from the selected RAT, such as MSInfo, SysParamInfo, PPM. The RAT gathers this information and responds to the PP. In step 909, the PP module sends the information as an IS-801 payload encapsulated in a SUPL_POS message, to the network PP server, through the underlying secure SUPL/TLS/TCP/IP connection via the RAT transport layer. The PP also requests satellite ephemeris, almanac, and network reference location information, to aid in the SET-based position calculation.

In step 910, the network SLP provides the satellite ephemeris, almanac, and network reference location information to MLM. In step 911, the MLM's PP module sends the satellite ephemeris, almanac, and network reference location information to the location engine driver, which then forwards the location information to the location engine for SET-Based final position calculation. In step 912, the PP module requests RAT-specific IS-801 MSInfo from the CDMA stack. In step 913, the PP IS-801 message exchange through SUPL_POS is repeated for the required number of fixes. If no more fixes are needed, then the PP module indicates the end of the session to the network. In step 914, each calculated final position result is sent back to the location service application. In step 915, the SLP sends a SUPL_END to end the SUPL session, if no more position fixes are needed.

As shown in the embodiments of FIGS. 8A through 9B, using the disclosed MLM permits greater flexibility, upgradability, extensibility, and adaptability for MM devices. This is because the disclosed MLM is independent of underlying transport methods and, therefore, is capable of doing what conventional devices cannot. Specifically, the MLM provides a universal and generic solution for all wireless technologies (e.g., CDMA, UTRA, GGE, LTE, WiFi, etc.), and all PP (GPS, GLONASS, BeiDou, Galileo, etc.).

The various embodiments of the MLM (as shown in FIGS. 2 through 9B), as well as other components of the wireless systems in which the MLM resides, may be implemented in hardware, software, firmware, or a combination thereof. In the preferred embodiment(s), the functionality of the MLM is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In another preferred embodiment, the MLM is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The various API interface with a program that comprises an ordered listing of executable instructions for implementing logical functions. The program can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed (e.g., Fortran cards, etc.), as the program can be electronically captured via, for instance, optical scanning of the paper or other medium, then compiled, interpreted or otherwise processed in a suitable manner if necessary, and then stored in a computer memory. In particular, computer-readable hardware means a non-transient computer-readable medium.

Although exemplary embodiments have been shown and described, it will be clear to those of ordinary skill in the art that a number of changes, modifications, or alterations to the disclosure as described may be made. For example, while particular RATs and PPs have been recited for purposes of clarity, those having skill in the art will understand that the transport-independent packets can be used with any RAT and any PP due to being independent of the underlying transport mechanisms. These and all other such changes, modifications, and alterations should therefore be seen as within the scope of the disclosure.

What is claimed is:

1. A multimode (MM) device, comprising:
a MM controller (MMC) configured to provide packet data service over radio access technologies (RATs); and
a MM Location Protocol Manager (MLM) configured to interface with the MMC, the MLM being further configured to use transport-independent packets, the transport-independent packets being transportable over each of the RATs and transportable from a current RAT to a second RAT, the MLM comprising:
- a positioning protocol (PP) subsystem configured to employ PPs;
- a Secure User Plane Location (SUPL) circuit configured to query the MMC for the current RAT using a first application programming interface (API), the SUPL circuit being further configured to communicate with the PP subsystem via a second API and to instruct the PP subsystem, using the second API, to select a PP corresponding to the current RAT, and to generate the transport independent packets common to each of the PPs; and
- a Transport Layer Security (TLS) circuit configured to establish a secure transport layer for the transport-independent packets, wherein the first and the second APIs are from among a generic set of APIs including a MLM-MMC API that defines a communication interface between the MMC and the MLM, and a MLM-PP API that defines a communication interface between the MLM and the PP subsystem irrespective of whether modules associated with the PP subsystem reside internally or externally to the MLM, such that the first API enables the SUPL circuit to query the MMC for the current RAT regardless of which of the RATs is selected as the current RAT by the SUPL circuit, and the second API enables the SUPL circuit to communicate with the PP subsystem regardless of which of the PPs is selected corresponding to the current RAT.

2. The MM device of claim 1, the current RAT being one selected from the group consisting of:
- CDMA (Code Division Multiple Access);
- UTRA (UMTS (Universal Mobile Telecommunications System) Terrestrial Radio Access);
- GSM (Global System for Mobile Communications);
- GPRS (General Packet Radio Service);
- EDGE (Enhanced Data for GSM Evolution);
- LTE (Long Term Evolution);
- GGE (GSM/GPRS/EDGE); and
- WiFi.

3. The MM device of claim 1, the PP subsystem comprising a PP selected from the group consisting of:
- LPP (Long Term Evolution (LTE) Positioning Protocol);
- IS-801; and
- RRLP (Radio Resource Location Protocol).

4. The MM device of claim 1, further comprising:
- an Application Processor (AP) comprising the MMC and the MLM; and
- a modem communicatively coupled to the AP.

5. The MM device of claim 4, the modem being one selected from the group consisting of:
- a CDMA (Code Division Multiple Access) modem;
- a UTRA (UMTS (Universal Mobile Telecommunications System) Terrestrial Radio Access) modem;
- a GSM (Global System for Mobile Communications) modem;
- a GPRS (General Packet Radio Service) modem;
- an EDGE (Enhanced Data for GSM Evolution) modem;
- a LTE (Long Term Evolution) modem;
- a GGE (GSM/GPRS/EDGE) modem; and
- a WiFi-compatible modem.

6. The MM device of claim 1, further comprising:
- a modem comprising the MMC and the MLM; and
- an Application Processor (AP) communicatively coupled to the modem.

7. The MM device of claim 6, the modem being one selected from the group consisting of:
- a CDMA (Code Division Multiple Access) modem;
- a UTRA (UMTS (Universal Mobile Telecommunications System) Terrestrial Radio Access) modem;
- a GSM (Global System for Mobile Communications) modem;
- a GPRS (General Packet Radio Service) modem;
- an EDGE (Enhanced Data for GSM Evolution) modem;
- a LTE (Long Term Evolution) modem;
- a GGE (GSM/GPRS/EDGE) modem; and
- a WiFi-compatible modem.

8. The MM device of claim 1, further comprising:
- a modem communicatively coupled to the MMC;
- an Application Processor (AP) communicatively coupled to the MMC; and
- the data card further comprising: the MLM, the AP, and the modem.

9. The MM device of claim 1, further comprising:
- a location engine driver operatively coupled to the PP subsystem; and
- location engines operatively coupled to the location engine driver.

10. The MM device of claim 9, the location engines comprising a location engine selected from the group consisting of:
- a GPS (Global Positioning System) location engine;
- a GLONASS (Global Navigation Satellite System) location engine;
- a BeiDou location engine; and
- a Galileo location engine.

11. The MM device of claim 1, wherein the MLM is configured to communicate with each of the RATs via the MMC by (i) the MLM communicating with the MMC using a MLM-MMC API from among the generic set of APIs, and (ii) the MMC communicating with each of the RATs using a MMC-RAT API from among the generic set of APIs.

12. The MM device of claim 1, wherein the generic set of APIs further includes MMC-RAT APIs, MLM-RAT APIs, MLM-application processor (MLM-AP) APIs, MLM-location engine (LocEng) APIs, and MLM-Data APIs.

13. In multimode (MM) wireless communication environment having multiple radio access technologies (RATs) and multiple positioning protocols (PPs), a MM system comprising:
- a MM controller (MMC) configured to determine a current RAT by obtaining status from modems of the multiple RATs in response to communications from a Secure User Plane Location (SUPL) circuit querying the MMC for the current RAT in accordance with a first application programming interface (API); and
- a positioning protocol (PP) subsystem configured to select a PP that corresponds to the current RAT in response to communications from the SUPL circuit instructing the PP subsystem to select the current RAT in accordance with a second API, wherein the SUPL circuit is configured to generate transport-independent packets, the transport-independent packets being transportable over each of the RATs and transportable from the current RAT to a second RAT, the transport-independent packets further being common to each of the PPs; and
- a Transport Layer Security (TLS) circuit configured to securely transport the transport-independent packets over the current RAT, wherein the SUPL circuit is further configured to employ location services using the selected PP, and wherein the first and the second APIs are from among a generic set of APIs including a MM Location Protocol Manager (MLM)-MMC API that defines a communication interface between the MMC and a MLM, and a MLM-PP API that defines a communication interface between the MLM and the PP subsystem irrespective of whether modules associated with the PP subsystem reside internally or externally to the MLM, such that the first API enables the SUPL circuit to query the MMC for the current RAT regardless of which of the RATs is selected as the current RAT by the SUPL circuit, and the second API enables the SUPL circuit to communicate with the PP subsystem regardless of which of the PPs is selected corresponding to the current RAT.

14. The MM system of claim 13, the current RAT being one selected from the group consisting of:
CDMA (Code Division Multiple Access);
UTRA (UMTS (Universal Mobile Telecommunications System) Terrestrial Radio Access);
GSM (Global System for Mobile Communications);
GPRS (General Packet Radio Service);
EDGE (Enhanced Data for GSM Evolution);
LTE (Long Term Evolution);
GGE (GSM/GPRS/EDGE); and
WiFi.

15. The MM system of claim 13, the selected PP being one selected from the group consisting of:
LPP (Long Term Evolution (LTE) Positioning Protocol);
IS-801; and
RRLP (Radio Resource Location Protocol).

16. The MM system of claim 13, further comprising:
a modem communicatively coupled to the packet transporter.

17. The MM system of claim 16, the modem being one selected from the group consisting of:
a CDMA (Code Division Multiple Access) modem;
a UTRA (UMTS (Universal Mobile Telecommunications System) Terrestrial Radio Access) modem;
a GSM (Global System for Mobile Communications) modem;
a GPRS (General Packet Radio Service) modem;
an EDGE (Enhanced Data for GSM Evolution) modem;
a LTE (Long Term Evolution) modem;
a GGE (GSM/GPRS/EDGE) modem; and
a WiFi-compatible modem.

18. In a multimode (MM) wireless communication environment having multiple radio access technologies (RATs) and multiple positioning protocols (PPs), a method comprising:
determining a current RAT by obtaining status from modems of the multiple RATs in response to communications from a Secure User Plane Location (SUPL) circuit querying a MM controller (MMC) for the current RAT in accordance with a first application programming interface (API);
selecting a PP that corresponds to the current RAT in response to communications from the SUPL circuit instructing the PP subsystem to select the current RAT in accordance with a second API;
generating transport-independent packets, the transport-independent packets being transportable over each of the RATs and transportable from the current RAT to a second RAT, the transport-independent packets further being common to each of the PPs;
securely transporting the transport-independent packets over the current RAT; and
employing location services using the selected PP,
wherein the first and the second APIs are from among a generic set of APIs including a MM Location Protocol Manager (MLM)-MMC API that defines a communication interface between the MMC and a MLM, and a MLM-PP API the defines a communication interface between the MLM and the PP subsystem irrespective of whether modules associated with the PP subsystem reside internally or externally to the MLM, such that the first API enables the SUPL circuit to query the MMC for the current RAT regardless of which of the RATs is selected as the current RAT by the SUPL circuit, and the second API enables the SUPL circuit to communicate with the PP subsystem regardless of which of the PPs is selected corresponding to the current RAT.

19. The method of claim 18, further comprising:
detecting a handoff from the current RAT to the second RAT;
dynamically selecting a PP that corresponds to the second RAT; and
securely transporting the transport-independent packets over the second RAT.

20. The method of claim 18, wherein the step of securely transporting the transport-independent packets is one selected from the group consisting of:
transporting data over a CDMA (Code Division Multiple Access) modem;
transporting data over a UTRA (UMTS (Universal Mobile Telecommunications System) Terrestrial Radio Access) modem;
transporting data over a GSM (Global System for Mobile Communications) modem;
transporting data over a GPRS (General Packet Radio Service) modem;
transporting data over an EDGE (Enhanced Data for GSM Evolution) modem;
transporting data over a LTE (Long Term Evolution) modem;
transporting data over a GGE (GSM/GPRS/EDGE) modem; and
transporting data over a WiFi-compatible modem.

21. The method of claim 18, wherein the step of selecting the PP that corresponds to the current RAT is one selected from the group consisting of:
selecting LPP (Long Term Evolution (LTE) Positioning Protocol) as the PP;
selecting IS-801 as the PP; and
selecting RRLP (Radio Resource Location Protocol) as the PP.

* * * * *